United States Patent
Schwimmer et al.

(10) Patent No.: US 11,297,357 B2
(45) Date of Patent: Apr. 5, 2022

(54) SYSTEMS AND METHODS FOR INTERRUPTING STREAMING CONTENT PROVIDED VIA AN INVIOLATE MANIFEST PROTOCOL

(71) Applicant: GOOGLE LLC, Mountain View, CA (US)

(72) Inventors: Michael Schwimmer, Mountain View, CA (US); Kevin Flanagan, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/344,439

(22) PCT Filed: Jan. 27, 2017

(86) PCT No.: PCT/US2017/015461
§ 371 (c)(1),
(2) Date: Apr. 24, 2019

(87) PCT Pub. No.: WO2018/125269
PCT Pub. Date: Jul. 5, 2018

(65) Prior Publication Data
US 2019/0327505 A1    Oct. 24, 2019

Related U.S. Application Data

(60) Provisional application No. 62/441,045, filed on Dec. 30, 2016.

(51) Int. Cl.
*H04N 21/239* (2011.01)
*H04N 21/234* (2011.01)
(Continued)

(52) U.S. Cl.
CPC ... *H04N 21/23424* (2013.01); *H04N 21/2393* (2013.01); *H04N 21/23106* (2013.01); *H04N 21/26258* (2013.01); *H04N 21/8456* (2013.01)

(58) Field of Classification Search
CPC ....... H04N 21/23424; H04N 21/23106; H04N 21/2393; H04N 21/26258; H04N 21/8456;
(Continued)

(56) References Cited

U.S. PATENT DOCUMENTS

2006/0168295 A1* 7/2006 Batterberry ............ H04L 65/80
709/231
2010/0299552 A1   11/2010 Schlack et al.
(Continued)

FOREIGN PATENT DOCUMENTS

| KR | 10-2005-0057532 | 6/2005 |
| KR | 10-2016-0077077 A | 7/2016 |
| WO | WO-2015/162376 A1 | 10/2015 |

OTHER PUBLICATIONS

International Preliminary Report on Patentability and Written Opinion for PCT/US2017/015461 dated Jul. 11, 2019 (9 pages).
(Continued)

*Primary Examiner* — Alazar Tilahun
(74) *Attorney, Agent, or Firm* — Marshall, Gerstein & Borun LLP

(57) ABSTRACT

The present disclosure provides systems and methods for interrupting streaming content provided via a manifest inviolate protocol. An intelligent streaming server or edge cache may substitute different content than that which is requested, without the client's knowledge. In some implementations, the client may request a first segment of a file or stream, and the streaming server may instead deliver a segment of an entirely different file or stream. The replacement segment may have the same length as the requested
(Continued)

Manifest 100

| Manifest Metadata 102 | |
|---|---|
| File metadata 104a | File address 106a |
| File metadata 104b | File address 106b |
| File metadata 104c | File address 106c |
| ooo | |
| File metadata 104n | File address 106n | segment, and may be renamed such that the client believes that the requested segment has been properly served. Accordingly, without changing the manifest or departing from the requirements of the manifest-inviolate protocol and without changing any functionality of the client, a system may provide content switching on a per-segment basis, rather than a per-manifest basis.

20 Claims, 4 Drawing Sheets

(51) Int. Cl.
*H04N 21/231* (2011.01)
*H04N 21/262* (2011.01)
*H04N 21/845* (2011.01)

(58) Field of Classification Search
CPC .......... H04N 21/6332; H04N 21/23439; H04L 65/4092; H04L 67/02; H04L 65/80
See application file for complete search history.

(56) References Cited

U.S. PATENT DOCUMENTS

| | | | | |
|---|---|---|---|---|
| 2011/0246621 | A1* | 10/2011 | May, Jr | H04L 65/4084 709/219 |
| 2012/0011225 | A1 | 1/2012 | Keum et al. | |
| 2013/0173737 | A1 | 7/2013 | Liu et al. | |
| 2013/0179588 | A1 | 7/2013 | Mccarthy et al. | |
| 2014/0026052 | A1* | 1/2014 | Thorwirth | H04L 65/4084 715/721 |
| 2014/0089467 | A1* | 3/2014 | Beck | H04L 65/605 709/219 |
| 2015/0156519 | A1* | 6/2015 | Watanabe | H04N 5/77 725/116 |
| 2016/0112484 | A1 | 4/2016 | Liu | |
| 2017/0127103 | A1* | 5/2017 | Berthelot | H04L 65/4084 |
| 2017/0366591 | A1* | 12/2017 | Thomas | H04N 21/2365 |

OTHER PUBLICATIONS

International Search Report and Written Opinion for PCT/US2017/015461 dated Apr. 18, 2017 (16 pages).
Sodagar, Iraj, "[Part 3] MPD chaining for ad Insertion with early termination use case in DASH", Input: International Organisation for Standardisation or ISO/IEC JTC1/SC29/WG11 MPEG2016/m37776; Feb. 2016, San Diego, CA (69 pages).
Stockhammer, Thomas, "Technologies under Consideration for Dynamic Adaptive Streaming over HTTP 23009, parts 1, 2, 3, 4, 5 and 6", Systems subgroup, International Organisation for Standardisation; ISO/IEC/JTC1/SC29/WG11 Coding of Moving Pictures and Audio; Oct. 2016, Chengdu, China (65 pages).
"Descriptions of Core Experiments on DASH amendment", 107. MPEG Meeting; Jan. 13, 2014-Jan. 17, 2014; San Jose; (Motion Picture Expert Group or ISO/IEC JTC1/SC29/WG11), No. N14134, Jan. 18, 2014, XP030020872.
Chengdu, "Technologies under Consideration for DASH", 116. MPEG Meeting; Oct. 17, 2016; Motion Picture Expert Group or ISO/IEC JTC1/SC29/WG11, No. N16465, Nov. 17, 2016, XP030023137.
Examination Report for EP Appln. Ser. No. 17708899.4 dated Apr. 7, 2020 (6 pages).
Notice of Reasons for Rejection for JP Appln. Ser. No. 2019-522574 dated Jun. 1, 2020 (8 pages).
Office Action for KR Appln. Ser. No. 10-2019-7014618 dated May 26, 2020 (12 pages).
Stockhammer, Thomas, "Generic URN schemes including Multicast Distribution", 101. MPEG Meeting; Jul. 16, 2012-Jul. 20, 2012; Stockholm; (Motion Picture Expert Group or ISO/IEC JTC1/SC29/WG11) No. m25998, Jul. 15, 2012; XP030054333.
Tukomo, et al., "DASH: Unified Solution for DASH Push Even (CE-DPE)", 104. MPEG Meeting; Apr. 22, 2013-Apr. 26, 2013; Incheon; (Motion Picture Expert Group or ISO/IEC JTC1/SC29/WG11), No. m29144, Apr. 17, 2013, XP0300573675.
Examination Report for EP Appln. Ser. No. 17708899.4 dated Jun. 25, 2021 (4 pages).
Second Office Action for CN Appln. Ser. No. 201780066648.0 dated Jun. 3, 2021 (23 pages).
Examination Report for IN Appln. Ser. No. 201927015134 dated Mar. 22, 2021 (5 pages).
"Guidelines for Implementation: Ad Insertion in DASH", DASH Industry Forum, Version 0.9 (Community Review), Sep. 1, 2014 (30 pages).
Dubin et al., "Novel Ad Insertion Technique for MPEG-DASH", 2015 12th Annual IEEE Consumer Communications and Networking Conferences (CCNC), pp. 582-587 (6 pages).
Examination Report for EP Appln. Ser. No. 17708899.4 dated Oct. 9, 2020 (8 pages).
Office Action for CN Appln. Ser. No. 201780066648.0 dated Oct. 28, 2020 (27 pages).

* cited by examiner

SYSTEMS AND METHODS FOR INTERRUPTING STREAMING CONTENT PROVIDED VIA AN INVIOLATE MANIFEST PROTOCOL

RELATED APPLICATIONS

This application claims the benefit of and priority under 35 U.S.C. § 371 to P.C.T. Application No. PCT/US2017/015461, entitled "Systems and Methods for Interrupting Streaming Content Provided via an Inviolate Manifest Protocol," filed Jan. 27, 2017; which claims priority to and the benefit of U.S. Provisional Application No. 62/441,045, entitled "Systems and Methods for Interrupting Streaming Content Provided via an Inviolate Manifest Protocol," filed Dec. 30, 2016, the entirety of each of which is incorporated by reference herein.

BACKGROUND

Adaptive rate media streaming, such as that provided by the HTTP Live Streaming (HLS) protocol, involves a manifest or index that is delivered to a client device. The manifest identifies one or more short segments of the streamed media, sometimes referred to as blocks or chunks, and the client may retrieve and playback each segment in succession. The client may periodically request a new or updated manifest or index that identifies additional segments of media, such as live media that is newly created or produced.

In many of these protocols, once retrieved by the client, the manifest is inviolate; that is, the manifest cannot be altered by a server or streaming host once provided to the client, and the client will retrieve the segments in accordance with the retrieved manifest. Specifically, the server or host has no access to the client-side manifest, and even with an updated manifest, they can only remove the oldest segments from the manifest and add new segments to the end of the manifest, but existing segments cannot be modified. If the server wishes to provide different streaming content, it must wait until the client requests an updated or new manifest, e.g., after exhausting the previously retrieved manifest or downloading all of the identified segments for playback. This may result in delays when changing content, desynchronization of large numbers of streaming clients, wasted bandwidth and storage space, and user frustration.

SUMMARY

To change provided content without changing an inviolate manifest, an intelligent streaming server or edge cache may substitute different content than that which is requested, without the client's knowledge. Specifically, in some implementations, the client may request a first segment of a file or stream, and the intelligent streaming server may instead deliver a segment of an entirely different file or stream. The replacement segment may have the same length as the requested segment, and may be renamed such that the client believes that the requested segment has been properly served. Accordingly, without changing the manifest or departing from the requirements of the manifest-inviolate protocol and without changing any functionality of the client, a system may provide content switching on a per-segment basis, rather than a per-manifest basis.

These implementations are mentioned not to limit or define the scope of the disclosure, but to aid in understanding it. Particular implementations may be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Many instances of live broadcasts include breaks, such as commercial breaks, station promos or identifications, or even other live content, during which the broadcaster switches or "cuts away" from the live action to the alternate content. A broadcaster may switch from a camera showing on-field action during a sporting event to a camera showing talking announcers in a studio during a lull in the action, or may switch to a commercial or other content. In typical terrestrial broadcasting, this cut or switch may be performed by a live operator at a control room prior to distribution of the signal. The operator may monitor live (albeit off-air) camera feeds while other content is presented on-air and, if something interesting or exciting is about to happen, the operator may interrupt the alternate content and quickly cut or switch back to live action.

Figure 1:
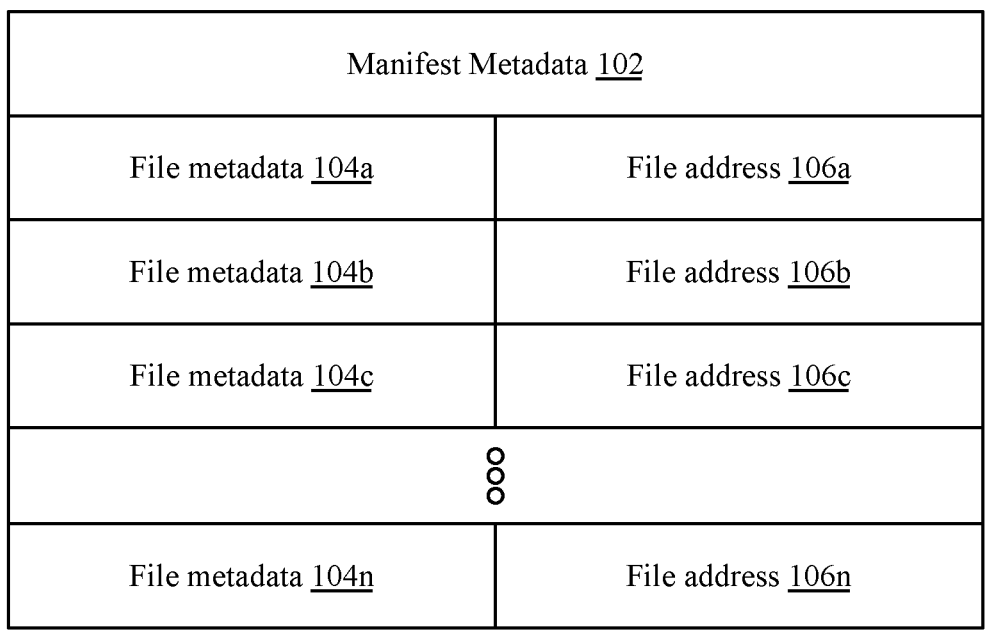
FIG. 1 is a block diagram of an implementation of a manifest for adaptive streaming.

Many multimedia streaming protocols, such as the HTTP Live Streaming (HLS) protocol, utilize a manifest or index that is periodically sent to or retrieved by each client. An example implementation of such a manifest 100 is illustrated in the block diagram of FIG. 1. The manifest 100 identifies one or more media segments that are part of the stream (e.g. by address 106a-106n, referred to generally as file or segment addresses 106), and the client device may retrieve, buffer, and play back each media segment in order. The manifest may also include file or segment metadata 104a-104n for each segment, such as content lengths, cues, content types, timestamps, or other such information.

In some implementations, known as adaptive bitrate streaming, the manifest may identify one or more alternate segments that correspond to the same content, but at different bitrates (e.g. content1_256 kbps.ts; content1_128 kbps.ts; etc.). The client may dynamically adjust bitrates based on network conditions or characteristics (e.g. bandwidth, latency, loss rates, etc.) to increase or lower the quality of the media stream as necessary, simply by requesting different alternate segments. In one such implementation, a client may retrieve a manifest that identifies a minute of media content, divided into six 10-second segments, with three alternate bitrates for each segment. The client may request the first segment at the lowest bitrate (e.g. segment1_low_quality.ts), and based on the time to retrieve the segment, may determine to request the second segment at a next bitrate (e.g. segment2_mid_quality.ts), and the third segment at a higher bitrate (e.g. segment3_high_quality.ts). If the network throughput or characteristics decline, the client may request a lower quality segment. Segments may be retrieved and buffered in advance. When the client has requested each of the segments identified in a manifest, the client may request a new or updated manifest identifying further segments for retrieval. The manifests may be periodically updated for live broadcast content. In one such implementation, a content producer may generate a portion of a live media stream, such as a minute, encode and segment the stream, and prepare and distribute a manifest identifying the segments of the portion (e.g. six 10-second segments). The producer may continue generating, encoding, and segmenting the stream, and may prepare and distribute a subsequent second manifest identifying the segments of the next portion (e.g. six 10-second segments of the next minute). This may continue for as long as the stream is available.

As discussed above, in some implementations, the producer or a publisher of the live stream may insert alternate content in the stream periodically, such as advertising content or other content, which may be live or pre-recorded, and may be referred to generally as "alternate" content as opposed to the main live content. In some implementations, the alternate content may be identical for all clients receiving the stream; while in other implementations the alternate content may be different for different clients. In one such implementation, a producer may schedule a break of a predetermined length, such as two minutes, and a content selector such as a publisher may select one or more items of alternate content equal to the predetermined length in total duration for distribution to clients during the break. The content may be selected and distributed to different regions, different device types, different users, or by any other such classes. In many implementations, the content may be inserted by adding it to a manifest for the client. The client may retrieve the manifest and retrieve segments of the main content (e.g. program1.ts, program 2.ts, etc.) until reaching a segment of alternate content identified in the manifest, and may then retrieve the identified segment of alternate content (e.g. station_break1.ts), in a similar manner. In some implementations, the manifest may be provided by an alternate source, sometimes referred to as a manifest manipulator, which may perform content selection for the predetermined breaks, and may insert region- or device-specific metadata and file identifiers into the manifest, and distribute the manifest to the corresponding client or clients.

In many manifest-based streaming protocols, once the manifest is delivered to the client, it may not be changed by the streaming server or media manipulator; the servers cannot "push" manifest updates to the client device. Accordingly, the client will continue to retrieve segments of media identified in the manifest and display them until exhausting the manifest (i.e. retrieving each segment identified in the manifest), until a timer expires and the client retrieves an updated manifest, or until the client ceases displaying the stream. Such protocols may be referred to as manifest-inviolate or inviolate manifest protocols, in that the manifest cannot be updated or changed once delivered to the client, and the system must wait for the client to request a new manifest.

This may be fine for content that does not include breaks or that only includes predetermined breaks, and in such implementations, manifests may be very long or identify a large number or long duration of segments. However, because the manifest is inviolate, the stream producer lacks the ability to interrupt a break early to return to a live camera. This may result in users of client devices missing action of a sporting event, missing the beginning of a speech of a political candidate who has just approached a podium, or otherwise missing important content, and may cause user frustration.

In one implementation, a system may allow for interruptions by making the manifest non-inviolable, such as by installing a client agent on each client device with the power to modify the manifest. The client agent may receive "push" notifications from a server and request a new manifest, may add information in a push notification to the manifest, or may request a new manifest constantly (e.g. every second). However, not only do these solutions require installation of client agents on each device (which may not be acceptable to users, may require additional storage on the device and bandwidth to download, and may create security vulnerabilities as network-listening agents), they may consume significant network or server resources (such as having to provide a new manifest every second to hundreds or thousands of client devices).

Accordingly, in other implementations discussed in more detail herein, to allow for live cut-ins or returns to live camera feeds, interrupting previously scheduled segments, an intelligent streaming server or edge cache may substitute different content than requested, without the client's knowledge. Specifically, in some such implementations, the client may request a segment (e.g. prerecorded_break_1.ts), and the streaming server may instead deliver a segment from the live feed (e.g. live_segment_6.ts). The replacement segment may have the same length as the requested segment, and may be renamed such that the client believes that the requested file has been properly served (e.g. renaming live_segment_6.ts as prerecorded_break_1.ts). Accordingly, without changing the manifest or departing from the requirements of the manifest-inviolate protocol and without changing any functionality of the client, a system may provide interruptions into regularly scheduled content and serving of alternative content.

In a similar implementation, the manifest may identify only live or main segments and the intelligent streaming server may substitute pre-recorded or alternate content for requested segments at the predetermined break time (modifying the file names or identifiers as discussed above), and ceasing modifications and returning to live segments when directed.

Such implementations may allow for very fast switching between prerecorded or alternate content and live content on the client, without wasting bandwidth and resources retransmitting manifests or providing the wrong content to the client device, requiring the right content to be re-downloaded. These implementations may also reduce user frustration as interesting live action will not be missed.

Figure 2A:
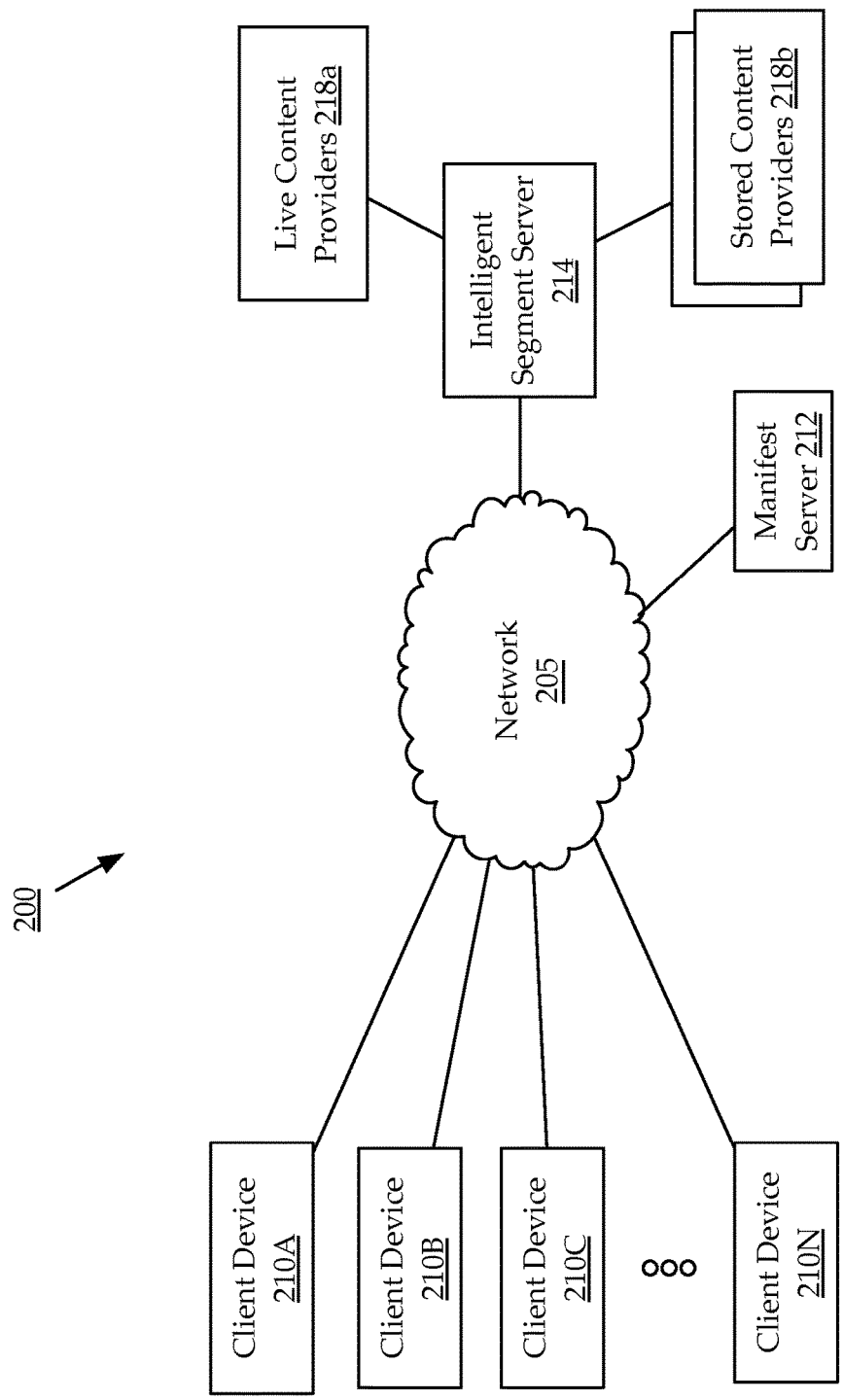
FIG. 2A is a block diagram of a content delivery environment, according to one implementation.

FIG. 2A is a block diagram of a content delivery environment 200, according to one implementation. A network 205 may connect one or more client devices 210A-210N (referred to generally as client device(s) 210); and a manifest server 212 and an intelligent streaming server 214. The intelligent streaming server 214 may receive content from one or more content providers, such as live content providers 218a and prerecorded or stored content providers 218b, referred to generally as content provider(s) 218, either directly or via network 205. In some implementations, one or more of the manifest server 212, intelligent streaming server 214, and content providers 218 may be provided by the same server or device; and conversely, in some implementations, the manifest server 212, intelligent streaming server 214, and content providers 218 may comprise a plurality of devices, such as a cloud, cluster, distributed content delivery system, or other such system. Accordingly, although only one intelligent streaming server 214 is illustrated, in many implementations, a plurality of servers may communicate via one or more networks 205.

Still referring to FIG. 2A and in more detail, network 205 may be any form of computer network or combinations of networks that relay information between client devices 210 and one or more intelligent streaming server 214, as well as other devices not illustrated. Network 205 may include the Internet and/or other types of data networks, such as a local area network (LAN), a wide area network (WAN), a cellular network, satellite network, or other types of data networks. Network 205 may also include any number of computing devices (e.g., computer, servers, routers, network switches, etc.) that are configured to receive and/or transmit data within network 205. Network 205 may further include any number of hardwired and/or wireless connections. A client device 210 may communicate wirelessly (e.g., via WiFi, cellular, radio, etc.) with a transceiver that is hardwired (e.g., via a fiber optic cable, a CAT5 cable, etc.) to other computing devices in network 205. In some implementations, a network 205 may be a virtual network, such as a virtual network between a plurality of virtual machines executed by a single physical machine, or an abstract network such as an offline transfer of data via physically movable media (e.g. a Sneakernet, transferring data via tape media, CD-ROM, flash media, external hard drives, floppy disks, etc.).

Client device(s) 210 may be referred to variously as a client, device, client device, computing device, user device, or any other such term, may be a desktop computer, laptop computer, tablet computer, smart phone, video game console, smart television or set top box, server, workstation, or any other type and form of computing device capable of communicating over a network 205. In some implementations, a client device 210 may execute an application, service, server, daemon, routine, or other executable logic for communicating over a network 205, such as a web browser, mail client, video player, music player, video game, or any other such application. Such applications may include a command line interface, graphical user interface, or any combination of these or other interfaces. In implementations in which a client device is a smart television or set top box, the client device may receive content via a first interface, such as a terrestrial, satellite, or cable broadcast; and may communicate with an audience measurement server via a second interface via network 205, such as an Ethernet or WiFi interface. In other implementations, client device 210 may receive content via network 205 and may transmit identifications of interactions via network 205.

A content provider 218 may include one or more computing devices connected to network 205 and configured for providing content to a client 210, either directly or via an intelligent streaming server 214. Content provider 218 may be referred to variously as a content provider, server, web server, data server, publisher, service provider, or by other similar terms. In many implementations, content provider 218 may include a plurality of computing devices configured as a server farm or cloud, and may include routers, load balancers, network address translators, firewalls, or other such devices. Content providers 218 may be computer servers (e.g., FTP servers, file sharing servers, web servers, etc.) or combinations of servers (e.g., data centers, cloud computing platforms, etc.). Content providers 218 may provide any type and form of content, including text, images, video, audio, multimedia, or other data, or any combination of these. Content may include live media content, prerecorded media content, rendered content, movies, television shows, podcasts, video blogs, video games or other interactive content, advertising in any format, social media, or any other type and form of content. Although shown connected to an intelligent streaming server 214, in many implementations, content providers may communicate with intelligent streaming server 214 via network 205, and may deliver content to client devices 210 via network 205. In other implementations, intelligent streaming server 214 may retrieve content from the content providers 218 and may cache the content for delivery to client devices. Thus, intelligent streaming server 214 may comprise one or more edge caches or distributed content servers.

A manifest server 212, sometimes referred to as a manifest manipulator, manifest modifier, personalized manifest creator, or any other such term, may include one or more computing devices connected to network 205 and configured for generating and providing manifests to client devices 210 and, in some implementations, intelligent streaming server 214. Manifest server 212 may comprise a file server, web server, data server, or any similar data source. In many implementations, manifest server 212 may include a plurality of computing devices configured as a server farm or cloud, and may include routers, load balancers, network address translators, firewalls, or other such devices. In some implementations, a manifest server 212 may be a content provider 218.

An intelligent streaming server 214 may comprise one or more computing devices, appliances, or servers, such as a server farm or cloud. In many implementations, intelligent streaming server 214 may be a regionally distributed server or edge cache for serving a specific geographic region. In some implementations, intelligent streaming server 214 may comprise one or more virtual servers executed by a physical machine. The intelligent streaming server 214 may provide content segments to client devices 10 on request, and may dynamically select between providing requested content segments, or substituting alternate content segments, as discussed above. In some implementations, the intelligent streaming server 214 may also provide manifests, and may serve the functions of manifest server 212.

Figure 2B:
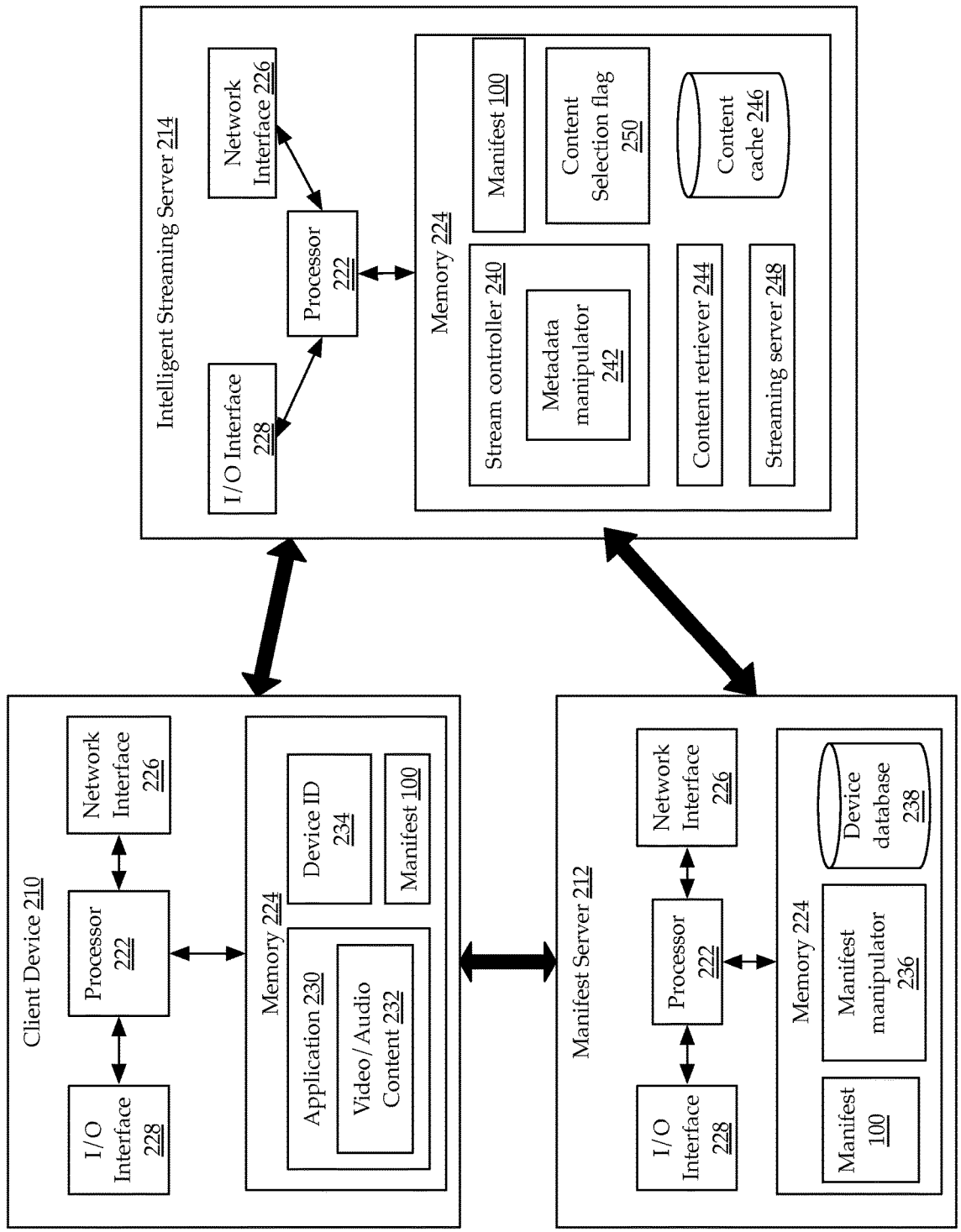
FIG. 2B is a block diagram of client and server devices shown in FIG. 2A, according to one implementation.

FIG. 2B is a block diagram of client and server devices shown in FIG. 2A, according to one implementation. Referring first to client device 210, a client device may be a computing device of a client or audience member of a live media stream. Client device 210 may be any number of different types of user electronic devices configured to communicate via network 205, including without limitation, a laptop computer, a desktop computer, a tablet computer, a smartphone, a digital video recorder, a set-top box for a television, a video game console, or any other type and form of computing device or combinations of devices. In some implementations, the type of client device 210 may be categorized as a mobile device, a desktop device or a device intended to remain stationary or configured to primarily access network 205 via a local area network, or another category of electronic devices such as a media consumption device.

In many implementations, client device 210 includes a processor 222 and a memory 224. Memory 224 may store machine instructions that, when executed by processor 222 cause processor 222 to perform one or more of the operations described herein. Processor 222 may include a microprocessor, ASIC, FPGA, etc., or combinations thereof. In many implementations, processor 222 may be a multi-core processor or an array of processors. Memory 224 may include, but is not limited to, electronic, optical, magnetic, or any other storage devices capable of providing processor 222 with program instructions. Memory 224 may include a floppy disk, CD-ROM, DVD, magnetic disk, memory chip, ROM, RAM, EEPROM, EPROM, flash memory, optical media, or any other suitable memory from which processor 222 can read instructions. The instructions may include code from any suitable computer programming language such as, but not limited to, C, C++, C #, Java, JavaScript, Perl, HTML, XML, Python and Visual Basic.

Client device 210 may include one or more network interfaces 226. A network interface 226 may include any type and form of interface, including Ethernet including 10 Base T, 100 Base T, or 1000 Base T ("Gigabit"); any of the varieties of 802.11 wireless, such as 802.11a, 802.11b, 802.11g, 802.11n, or 802.11ac; cellular, including CDMA, LTE, 3G, or 4G cellular; Bluetooth or other short range wireless connections; or any combination of these or other interfaces for communicating with a network 205. In many implementations, client device 210 may include a plurality of network interfaces 226 of different types, allowing for connections to a variety of networks 205 or a network 205 such as the Internet via different sub-networks. Client device 210 may also include other interfaces for receiving terrestrial, satellite, or cable analog or digital broadcasts, as discussed above.

Client device 210 may include one or more user interface devices 228. A user interface device 228 may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interface devices may be internal to the housing of client device 210, such as a built-in display, touch screen, microphone, etc., or external to the housing of client device 210, such as a monitor connected to client device 210, a speaker connected to client device 210, etc., according to various implementations.

Client device 210 may include in memory 224 an application 230 or may execute an application 230 with a processor 222. Application 230 may be an application, applet, script, service, daemon, routine, or other executable logic for receiving manifests 100, retrieving identified content segments 232, and displaying or playing the content segments via an output interface 228 of the client device (e.g. display, speaker, etc.). In one implementation, application 230 may be a web browser. Application 230 may include functionality for displaying content received via network interface 226 and/or generated locally by processor 222. In some implementations, application 230 may be a media player or include an embedded media player, such as a plug-in or native media player within a web browser. Application 230 may provide user interfaces for interacting with content played in the media player, such as a skip control, dislike button, or any similar interface.

Client 210 may include or be identified with a device identifier 234. Device identifier 234 may be an alphanumeric string, data string, serial number, media access control (MAC) address, internet protocol (IP) address, username or account name, globally unique identifier (GUID), cookie, random or pseudorandom number, or any other type and form of identifier, including combinations of these or other identifiers. In some implementations, the device identifier 234 may be fixed to the device or preconfigured in the device, such as a manufacturer serial number or MAC address, while in other implementations, the device identifier 234 may be dynamically set by a content provider, streaming server, application 230, or other entity, such as a cookie or username. In some implementations, a unique or new device identifier 234 may be set for each communication to a content provider and/or audience measurement server, while in other implementations, the device identifier 234 may not be changed, or may be changed periodically (e.g. hourly, daily, weekly, etc.) or at other intervals (e.g. on restart of the client device, login to an internet service, etc.). In some implementations, a device identifier 234 may be associated with one or more other device identifiers 234 (e.g., a device identifier for a mobile device, a device identifier for a home computer, etc.). In many implementations, as discussed above, a device identifier 234 may be generated and/or transmitted to the device 210 by a content provider. In other implementations, as discussed above, client 210 may request a device identifier or cookie 234 from a streaming server or content provider, and may transmit the device identifier or cookie 234 to the streaming server or content provider in association with requests for content.

Also illustrated in FIG. 2B is a block diagram of an implementation of a manifest server 212. As with client devices 210, server 212 may include one or more processors 222, memories 224, network interfaces 226, and user interfaces 228. In some implementations referred to as headless servers, a server 212 may not include a user interface 228, but may communicate with clients 210 with user interfaces 228 via a network 205. Memory 224 may include content storage, such as storage of webpages, images, audio files, video files, data files, or any other type and form of data. In some implementations, memory 224 may store one or more applications (not illustrated) for execution by processor 222 of the server, including FTP servers, web servers, mail servers, file sharing servers, peer to peer servers, or other such applications for delivering content stored in content storage. Manifest server 212 may store in memory 224 one or more manifests 100, such as a general manifest for a media stream and personalized manifests for one or more regions, client devices, or other groups.

In some implementations, a server 212 may execute a manifest manipulator 236. Manifest manipulator 236 may comprise an application, service, server, daemon, routine, or other executable logic for generating and personalizing manifests, as discussed above. In some implementations, manifest server 212 may receive a manifest from a live content provider, the manifest identifying one or more predetermined breaks in a live stream (e.g. a two-minute break). The manifest manipulator 236 may modify the manifest or generate a new personalized manifest by inserting selected content segment identifiers into the manifest at the identified one or more predetermined breaks. The manifest server may provide the personalized manifest to one or more client devices. In one such implementation, the manifest server may receive a request for manifest from the client device, the request comprising a device identifier 234 of the client device. In some implementations, the manifest server may identify select content based on the device identifier. In other implementations, the device identifier 234 may be associated with one or more characteristics or traits (e.g. geographical location, favorite sports team, etc.) in a device database 238 stored in or maintained by the manifest server 212. Alternate content may be selected based on the characteristics, and the manifest altered accordingly. Although a manifest inviolate protocol, the manifest manipulator may alter the manifest because the manifest has not yet been delivered to a client device. Database 238 may comprise any type and form of database, flat file, data file, data array, or other data structure, for storing a plurality of device identifiers and associated traits or characteristics for content selection.

Also illustrated in FIG. 2B is a block diagram of an implementation of an intelligent streaming server 214. As with client devices 210, server 214 may include one or more processors 222, memories or storage devices 224, network interfaces 226, and user interfaces 228. In some implementations referred to as headless servers, a server 214 may not include a user interface 228, but may communicate with clients 210 or panelists 216 with user interfaces 228 via a network 205. Memory 224 may include content storage or cache 246, such as storage of live or main media stream segments, and alternate stream or file segments. In some implementations, memory 224 may store one or more applications for execution by processor 222 of the server, including FTP servers, web servers, mail servers, file sharing servers, peer to peer servers, or other such applications for delivering content stored in content storage, referred to generally as streaming 248. In some implementations, content storage 246 may be in one or more external storage devices, or may be distributed across one or more servers 212 or cloud storage devices. Content from content storage 246 may be provided to client devices 210. In some implementations, an intelligent streaming server may store a copy of a manifest 100 obtained from a manifest server 212 and/or a content provider.

Intelligent streaming server 214 may execute a stream controller 240. Stream controller 240 may comprise an application, applet, service, server, daemon, routine, or other executable logic for receiving a request from a client for a streaming media segment (e.g. a prerecorded media segment) identified in a manifest, and either providing the requested data file, or providing alternate data (e.g. live stream data), responsive to the setting of a content selection flag. In some implementations, the stream controller 240 may comprise a metadata manipulator 242, which may comprise an application, daemon, service, or other executable logic for modifying a data file of a media stream segment, such as an advertising segment, with metadata from a different data file of a media stream segment, such as a segment of a live stream.

In some implementations, streaming server 214 may execute a content retriever 244. Content retriever 244 may comprise an application, applet, server, service, daemon, routine, or other executable logic for requesting and/or retrieving streaming media segments from content providers and caching the content in a content cache 246; for requesting and/or retrieving manifests 100; or other such functions. Content retriever may comprise a browser application, web client, file transfer client, or any other type and form of application or client.

Figure 3:
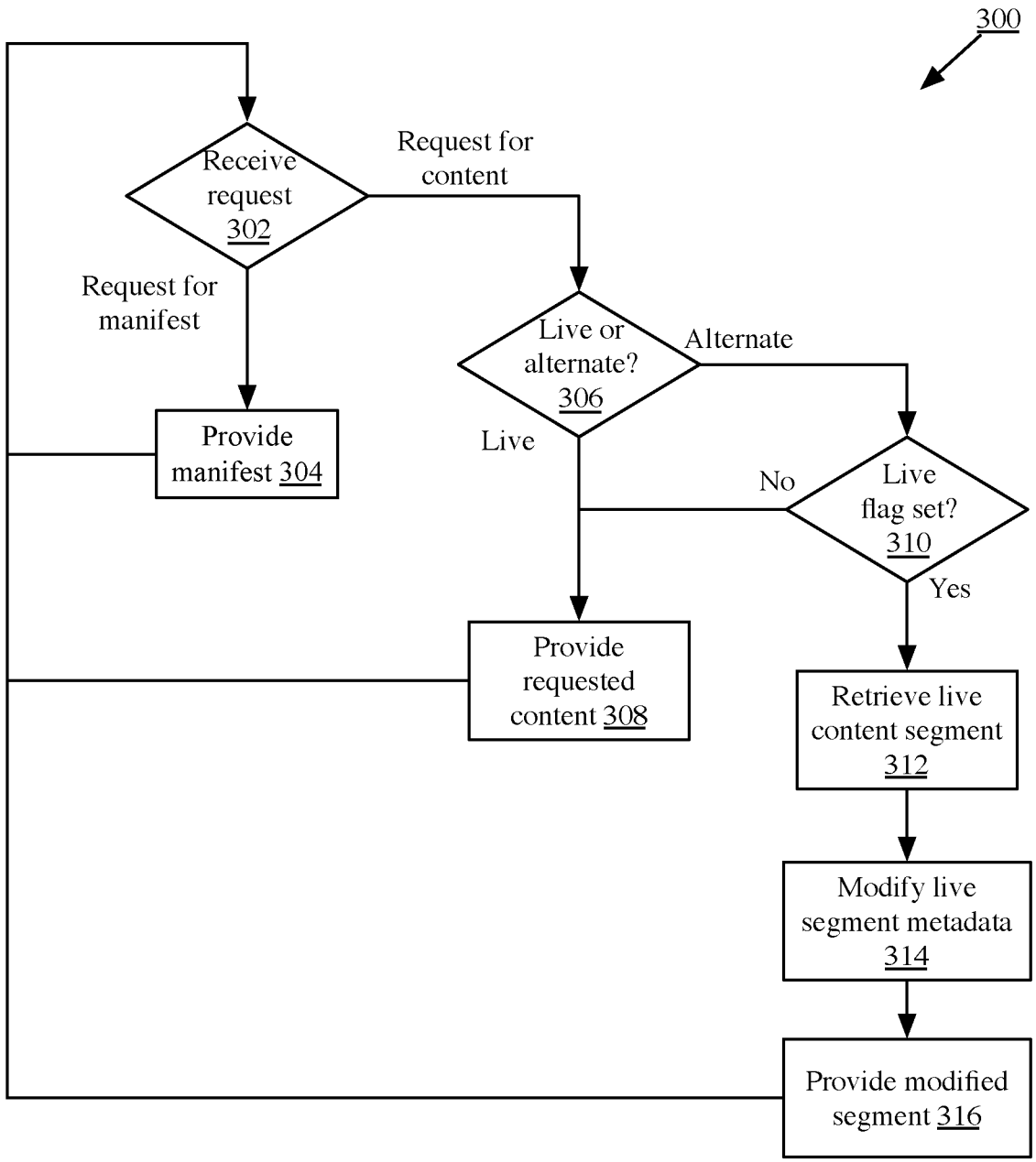
FIG. 3 is a flow chart of a method for providing interruptible streaming content via an inviolate manifest protocol, according to one implementation.

FIG. 3 is a flowchart of a method 300 for providing interruptible streaming content via an inviolate manifest protocol, according to one implementation. An intelligent streaming server may receive a request from a client device at step 302. In some implementations, the request may be a request for a manifest, and the streaming server may deliver the manifest to the client device. In some implementations, the streaming server may comprise a manifest server or communicate with a manifest server and retrieve the manifest from the manifest server for redistribution to client devices. In other implementations, the client device may request the manifest from a content provider or manifest server directly. The request many comprise a device identifier of the client device, user name, account name, or any other such identifier. The request may also comprise an identifier of the media stream or manifest, such that the streaming server may select the proper manifest for delivery. In some implementations, as discussed above, the manifest may be personalized for the client device, for client devices in a region, or client devices having other common characteristics. At step 304, the streaming server may provide the manifest to the client device. In some implementations, the server may transmit the manifest to the client device, while in other implementations, the server may transmit a redirect command or an address where the client may obtain the manifest (e.g. a manifest server address).

If the request is a request for a streaming content segment, then at step 306, the streaming server may determine if the request is for a segment of the live or main content stream, or a segment of the alternate content stream (e.g. station break, advertising, alternate content, etc.). In some implementations, the streaming server may determine to which stream the request corresponds based on an address of the request (e.g. "main_segment1.ts" vs. "alternate_segment1.ts" or "station_break_segment1.ts"). In other implementations, the stream may be explicitly identified in the request. If the request is for a segment of the live or main stream, then at step 308, the streaming server may provide the requested segment to the client device. As discussed above, providing the requested segment may comprise providing a segment having a requested bitrate of a plurality of related or corresponding segments having different bitrates. Providing the requested segment may comprise transmitting the segment to the client device, or may comprise transmitting a redirect command and address at which the requested segment may be obtained. The segment may comprise a data file comprising the encoded media data of the segment, such as a transport stream, mpeg stream, or other data; and metadata, such as a name of the segment and/or stream, a length of the segment, a presentation timestamp of the segment, or any other such information.

If the request is for a segment of an alternate content stream, then at step 310, the streaming server may determine if a live content stream flag has been set. As discussed above, the streaming server may periodically request a live content status flag from a live content provider, or the live content provider may push notifications to the streaming server with status flag updates, such as via a representational state transfer (RESTful) communication protocol. In one such implementation, the content provider may transmit an HTTP POST request with a parameter-value pair in a URL identifying a value of the flag, such as a first predetermined value for the live stream and a second predetermined value for the alternate stream. In another lightweight implementation, the flag may be transmitted via an options field in a header of a packet. In some such implementations, the streaming server may frequently retrieve data from the live content provider, such as additional live media stream segments and/or manifests, for caching and redistribution to client devices. With delivery of some or all of the segments and/or manifests, the live content provider may embed the value of the live status flag in metadata, such as in a header or options field of a data packet. The flag may thus comprise a single bit with a predetermined value indicating live streaming.

If the live streaming flag is not set, then at step 308, the streaming server may provide the requested alternate content. As discussed above, providing the requested segment may comprise providing a segment having a requested bitrate of a plurality of related or corresponding segments having different bitrates. Providing the requested segment may comprise transmitting the segment to the client device, or may comprise transmitting a redirect command and address at which the requested segment may be obtained. The segment may comprise a data file comprising the encoded media data of the segment, such as a transport stream, mpeg stream, or other data; and metadata, such as a name of the segment and/or stream, a length of the segment, a presentation timestamp of the segment, or any other such information.

If the live streaming flag is set, then at step 312, the streaming server may retrieve a live content segment from a live content provider or from a cache of the streaming server, the live content segment having been previously retrieved. The streaming server may retrieve a live content segment having a presentation timestamp corresponding to a present time or slightly in the future, may retrieve a live content segment that is subsequent to a previously transmitted live content segment, or otherwise retrieve a next live content segment. In some implementations, live content segments may be stored in a first-in, first-out (FIFO) buffer, and removed periodically and/or distributed to client devices (e.g. at each presentation timestamp identified in a manifest for the stream). In some implementations, segments may be received even during predetermined breaks (e.g. when a producer has indicated to cut away from the live stream), and may be removed and discarded periodically throughout the breaks (e.g. according to their durations or timestamps identified in the manifest). Accordingly, the cache may discard aged or expired segments in order to select the proper segment to deliver to the client. In other implementations, segments of the live content stream may not be delivered during breaks; instead, a "first" post-break segment may be delivered to the streaming server from the content provider when the producer indicates to cut away from the break, back to the main feed. The streaming server may use this segment as a proper live content segment to deliver to the client. The segment may have the same duration and bitrate as the requested alternate content segment.

At step 314, a stream controller of the server may modify the metadata of the retrieved live content segment. Modifying the metadata may include replacing a filename in a header of the segment data file with a filename of the requested segment of the alternate feed, replacing a stream identifier in the metadata or a header of the data file, or otherwise modifying the metadata or data file of the segment to appear to be the requested alternate content segment, albeit with different encoded media data. In implementations in which multiple client devices receive the same manifest, such as for a broadcast region, the modified live content segment may be cached and served in response to requests from other clients, skipping step 314 on successive iterations of method 300.

At step 316, the streaming server may provide the modified live content segment and metadata to the client device. Because the metadata has been modified, the client device may believe the received data file to be the requested data file of the alternate content stream, and may play the data file at the presentation time indicated in the manifest. Thus, while the client device may believe it is playing a segment of alternate content, such as a station break or advertisement, the actual decoded content will be part of the live content stream. This allows a producer to interrupt the alternate content stream at any segment break within the manifest, without needing to wait for a modified manifest to be delivered to each client, and without modifying the client devices, installing client agents, or otherwise not complying with the protocol requirements.

While the above description is concerned with an example in which the techniques described herein are used to revert to a live, or main content stream, the techniques may be used to interrupt streaming content provided via a manifest-inviolate streaming protocol for other purposes. For example, the techniques described herein may be used to interrupt streaming content so as to provide an announcement, such as a public service announcement. That is, while the techniques described herein may be used to return to previously streamed content, the techniques described herein are not limited thereto Accordingly, the systems and methods discussed herein provide for interrupting streaming content, provided via a manifest-inviolate adaptive bitrate streaming protocol. In a first aspect, the present disclosure describes a method for interrupting streaming content provided via a manifest inviolate protocol. The method includes receiving, by a streaming server from a client device, a first request for a first streaming segment identified in a manifest comprising a plurality of identifiers of streaming segments. The method also includes providing, by the streaming server to the client device, the first streaming segment responsive to the first request. The method further includes receiving, by the streaming server, a command to provide predetermined content to requesting client devices. The method also includes receiving, by the streaming server from the client device, a second request for a second streaming segment identified in the manifest. The method also includes providing, by the streaming server to the client device, responsive to receipt of the command to provide predetermined content and responsive to the second request, a third streaming segment different from the second segment.

In some implementations, the third streaming segment is not identified in the manifest. In some implementations, providing the third streaming segment further comprises modifying an identifier of the third streaming segment to match an identifier of the second streaming segment. In some implementations, providing the third streaming segment comprises transmitting a data file of the third streaming segment to the client device. In a further implementation, the method includes modifying metadata of the data file of the third streaming segment to match metadata of a data file of the second streaming segment prior to transmission of the data file of the third streaming segment to the client device.

In some implementations, the method includes receiving, from a second client device, a third request for the second streaming segment identified in the manifest; and providing the modified metadata of the data file of the third streaming segment and the data file of the third streaming segment from a cache of the streaming server. In some implementations, the method includes transmitting a request for a content selection flag to a content provider; and receiving the command comprising the content selection flag, responsive to the request. In a further implementation, the method includes transmitting the request for the content selection flag to the content provider at a predetermined frequency. In another further implementation, the method includes determining that the content selection flag indicates to provide the predetermined content; and wherein providing the third streaming segment is performed responsive to the content selection flag indicating to provide the predetermined content.

In another aspect, the present disclosure is directed to a system for interrupting streaming content provided via a manifest inviolate protocol. The system includes a streaming server, comprising a network interface in communication with a content provider and a client device, a storage device, and a processor of the streaming server executing a stream controller. The network interface is configured for receiving, from the client device, a first request for a first streaming segment identified in a manifest comprising a plurality of identifiers of streaming segments; and providing, to the client device, the first streaming segment responsive to the first request. The stream controller is configured for receiving a command to provide predetermined content to requesting client devices. The network interface is further configured for receiving, from the client device, a second request for a second streaming segment identified in the manifest; and providing, to the client device, responsive to receipt of the command to provide predetermined content and responsive to the second request, a third streaming segment different from the second segment.

In some implementations, the third streaming segment is not identified in the manifest. In some implementations, the stream controller is further configured for modifying an identifier of the third streaming segment to match an identifier of the second streaming segment. In some implementations, the network interface is further configured for transmitting a data file of the third streaming segment to the client device. In a further implementation, the stream controller is further configured for modifying metadata of the data file of the third streaming segment to match metadata of a data file of the second streaming segment prior to transmission of the data file of the third streaming segment to the client device.

In some implementations, the streaming server further comprises a cache; and the network interface is further configured for: receiving, from a second client device, a third request for the second streaming segment identified in the manifest; and providing the modified metadata of the data file of the third streaming segment and the data file of the third streaming segment from the cache of the streaming server. In some implementations, the streaming server is further configured for: transmitting, via the network interface, a request for a content selection flag to a content provider; and receiving, via the network interface, the command comprising the content selection flag, responsive to the request. In a further implementation, the streaming server is further configured for transmitting the request for the content selection flag to the content provider at a predetermined frequency. In another further implementation, the streaming server is further configured for determining that the content selection flag indicates to provide the predetermined content; and wherein the network interface is further configured for providing the third streaming segment responsive to the content selection flag indicating to provide the predetermined content.

In another aspect, the present disclosure is directed to a non-transitory computer readable storage medium storing one or more programs configured for execution by a first computing device that includes one or more processors and a memory storing the one or more programs. The one or more programs include instructions for receiving, from a client device, a first request for a first streaming segment identified in a manifest comprising a plurality of identifiers of streaming segments; providing, to the client device, the first streaming segment responsive to the first request; receiving a command to provide predetermined content to requesting client devices; receiving, from the client device, a second request for a second streaming segment identified in the manifest; and providing, to the client device, responsive to receipt of the command to provide predetermined content and responsive to the second request, a third streaming segment different from the second segment. In some implementations, the one or more programs further comprise instructions for: modifying metadata of the data file of the third streaming segment to match metadata of a data file of the second streaming segment; and transmitting a data file of the third streaming segment to the client device.

In many implementations, demographic information about users utilized for alternate content selection may be anonymized or disambiguated to protect the privacy of the device user. In many such implementations or similar situations in which personal information about the user of a client device may be collected for measurement or used to select third-party content, the user may be provided with an opportunity to control whether programs or features that may collect personal information (e.g., information about a user's social network, social actions or activities, a user's preferences, or a user's current location) do so, or an opportunity to control whether or how to transmit measurement data to an audience measurement server and/or panel provider. In addition, certain data may be treated in one or more ways before it is stored or used by an audience measurement server, so that personally identifiable information is removed when generating parameters (e.g., demographic parameters). In some implementations, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by the manifest server, intelligent streaming server, and content providers.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, such as a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Communication networks may include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method for interrupting streaming content provided via a manifest inviolate protocol, comprising:
    receiving, by a streaming server from a client device, a first request for a first streaming segment identified in a manifest comprising a plurality of identifiers of streaming segments;
    providing, by the streaming server to the client device, the first streaming segment responsive to the first request, the first streaming segment corresponding to alternate content;
    receiving, by the streaming server from a manifest server, a command to switch from alternate content to main content;
    receiving, by the streaming server from the client device subsequent to the command to switch from the alternate content to the main content, a second request for a second streaming segment identified in the manifest, the second streaming segment corresponding to the alternate content; and
    providing, by the streaming server to the client device, responsive to (i) the command to switch from the alternate content to the main content and (ii) the second request, a third streaming segment different from the second segment, the third streaming segment corresponding to the main content.

2. The method of claim 1, wherein the third streaming segment is not identified in the manifest.

3. The method of claim 1, wherein providing the third streaming segment further comprises modifying an identifier of the third streaming segment to match an identifier of the second streaming segment.

4. The method of claim 1, wherein providing the third streaming segment comprises transmitting a data file of the third streaming segment to the client device.

5. The method of claim 4, further comprising modifying metadata of the data file of the third streaming segment to match metadata of a data file of the second streaming segment prior to transmission of the data file of the third streaming segment to the client device.

6. The method of claim 5, further comprising:
    receiving, from a second client device, a third request for the second streaming segment identified in the manifest; and
    providing the modified metadata of the data file of the third streaming segment and the data file of the third streaming segment from a cache of the streaming server.

7. The method of claim 1, wherein receiving a command to switch from alternate content to main content further comprises:
    transmitting, by the streaming server, a request for a content selection flag to the manifest server; and
    receiving, by the streaming server from the manifest server, the command comprising the content selection flag, responsive to the request.

8. The method of claim 7, further comprising transmitting the request for the content selection flag to the manifest server at a predetermined frequency.

9. The method of claim 7, further comprising determining that the content selection flag indicates to switch to the main content, and wherein providing the third streaming segment is performed responsive to the content selection flag indicating to switch to the main content.

10. A system for interrupting streaming content provided via a manifest inviolate protocol, comprising:
    a streaming server, comprising a network interface in communication with a content provider and a client device, a storage device, and a processor of the streaming server executing a streaming controller;
    the network interface is configured to:
    receive, from the client device, a first request for a first streaming segment identified in a manifest comprising a plurality of identifiers of streaming segments, and
    provide, to the client device, the first streaming segment responsive to the first request, the first streaming segment corresponding to alternate content;
    the streaming controller is configured to:
    receive a command, from the content provider, to switch from alternate content to main content; and
    the network interface is further configured to:
    receive, from the client device, subsequent to the command to switch from the alternate content to the main content, a second request for a second streaming segment identified in the manifest, the second streaming segment corresponding to the alternate content; and
    provide, to the client device, responsive to (i) the command to switch from the alternate content to the main content and (ii) the second request, a third streaming segment different from the second segment, the third streaming segment corresponding to the main content.

11. The system of claim 10, wherein the third streaming segment is not identified in the manifest.

12. The system of claim 10, wherein the stream controller is further configured to modify an identifier of the third streaming segment to match an identifier of the second streaming segment.

13. The system of claim 10, wherein the network interface is further configured to transmit a data file of the third streaming segment to the client device.

14. The system of claim 13, wherein the streaming controller is further configured to modify metadata of the data file of the third streaming segment to match metadata of a data file of the second streaming segment prior to transmission of the data file of the third streaming segment to the client device.

15. The system of claim 14, wherein the streaming server further comprises a cache, and wherein the network interface is further configured to:
    receive from a second client device, a third request for the second streaming segment identified in the manifest; and
    provide the modified metadata of the data file of the third streaming segment and the data file of the third streaming segment from the cache of the streaming server.

16. The system of claim 10, wherein the streaming server is further configured to:
    transmit, via the network interface, a request for a content selection flag to the content provider; and
    receive, via the network interface, the command comprising the content selection flag, responsive to the request.

17. The system of claim 16, wherein the streaming server is further configured to transmit the request for the content selection flag to the content provider at a predetermined frequency.

18. The system of claim 17, wherein the streaming server is further configured to determine that the content selection flag indicates to switch from the alternate content to the main content; and
    wherein the network interface is further configured to provide the third streaming segment responsive to the content selection flag indicating to switch from the alternate content to the main content.

19. A non-transitory computer readable storage medium storing one or more programs configured for execution by a first computing device that includes one or more processors and a memory storing the one or more programs, the one or more programs comprising instructions for:
    receiving, from a client device, a first request for a first streaming segment identified in a manifest comprising a plurality of identifiers of streaming segments;
    providing, to the client device, the first streaming segment responsive to the first request, the first streaming segment corresponding to alternate content;
    receiving a command from a content provider to switch from alternate content to main content;
    receiving, from the client device, subsequent to the command to switch from the alternate content to the main content, a second request for a second streaming segment identified in the manifest, the second streaming segment corresponding to the alternate content; and
    providing, to the client device, responsive to (i) the command to switch from alternate content to main content and (ii) the second request, a third streaming segment different from the second segment, the third streaming segment corresponding to the main content.

20. The non-transitory computer readable storage medium of claim 19, wherein the one or more programs further comprise instructions for:
    modifying metadata of the data file of the third streaming segment to match metadata of a data file of the second streaming segment; and
    transmitting a data file of the third streaming segment to the client device.

* * * * *